United States Patent Office 3,766,123
Patented Oct. 16, 1973

3,766,123
METHOD OF RENDERING HYDROPHOBIC THE SURFACE OF A TRANSPARENT SHEET AND SURFACE-CONDITIONING COMPOSITION THEREFOR
Robert T. Burnie, Renton, Wash., David W. Clarke, Callicoon, N.Y., and Wilson S. Hamilton, Bellevue, Wash., assignors to The Boeing Company, Seattle, Wash.
No Drawing. Filed July 30, 1965, Ser. No. 476,195
Int. Cl. C09k 3/18; C08g 31/09, 31/44
U.S. Cl. 260—32.4                                    2 Claims

ABSTRACT OF THE DISCLOSURE

A substantially solid stream of surface conditioning composition liquid is projected onto an aircraft windshield substantially in the direction of airflow over the windshield and at an angle of 10° to 45° to the plane of the windshield, and a spreading component of the composition will cause the composition to spread rapidly over a large area of the windshield surface without assistance of a mechanical device such as a windshield wiper. A composition which will maintain reasonable good visibility through the windshield for a period up to 10 or 15 minutes includes a mixture of a repellent component which is a copolymer of the silicotitanium type, silicosilicon type or silicozirconium type of about 5% by weight, a spreading component which may be a cationic amino chemical in which the cation portion of the molecule has at least four carbon atoms, and a solvent component for the repellent component and the spreading component which may be a hydrocarbon, an alcohol, or 1,1,2-1,2,2-trichlorotrifluoroethane.

---

This invention is concerned with rendering hydrophobic the surface of a transparent windshield for a vehicle, such as an airplane, a boat or an automotive vehicle, so that the windshield surface will repel rain and thus preserve good visibility through it. The invention further pertains to an improved composition useful in performing such method.

Prior to the present invention it has been proposed to render the surface of airplane windshields hydrophobic by the application of chemical compositions to them, either on the ground when the surface of the windshield is dry or in flight when the surface of the windshield is wet with rain. Such attempts have not been practical. A coating applied to a dry windshield on the ground for the purpose of rendering it hydrophobic has been washed off during flight so that when good visibility through the windshield is of greatest importance, namely during landing approach of the airplane, the coating treatment has lost its effectiveness. To condition a windshield surface during flight and while rain is impinging upon it has presented very difficult problems which had not been solved satisfactorily prior to the present invention.

In order to render the surface of an airplane windshield hydrophobic in flight by the application of a composition to the windshield surface, it has been recognized heretofore that the coating applied to the surface must be optically clear and must provide satisfactory visibility through the windshield under varying rain conditions and under different degrees of cleanliness of the sheet surface. Water should be dissipated from the windshield surface in droplets of a size which will not interfere with vision. The coating should be persistent such as being effective to maintain reasonably good visibility through the windshield for several minutes and preferably up to ten or fifteen minutes. The coating should not produce an objectionable glare under varying conditions of light intensity and should not itself reduce the transparency of the windshield greatly, whether applied in a thin film or in relatively large quantities. Moreover, the coating should be capable of being applied to the windshield surface easily and in flight while it is raining. During or after the rain the coating should not cause dust or other foreign particles to adhere to it which might obstruct or distort vision through the windshield. Other desirable characteristics are that the coating material should have a reasonably high flash point, good storage stability and both the material and its vapors should be substantially nontoxic. Also, such material should not deteriorate materials of the airplane, such as aluminum, magnesium, titanium, copper and their alloys, ferrous alloys, windshield materials such as glass or plastic, gasket materials such as rubber or synthetic rubber, or aircraft finishes.

Additional desirable characteristics of such coating materials which have been recognized in connection with the present invention are that, in order to apply the conditioning composition easily and effectively during flight, it must be capable of spreading over a considerable windshield area rapidly from a single point of application even when the application is made while rain is impinging against the windshield. On the contrary, if the coating material is applied to the windshield intentionally or inadvertently when the windshield is dry, a coating should not be formed on the windshield surface which is difficult to remove or which appreciably reduces the transparency of the windshield.

It is an object to provide a windshield surface-conditioning composition which will be effective to render hydrophobic the surfaces of transparent sheets of different types of material, such as different types of glass or different types of plastic, such, for example, as acrylic sheet.

A further object is to enable repeated applications of the conditioning composition to be applied to the windshield without building up an undesirably thick coating of the treating material.

An additional object is to provide such a conditioning composition which can be applied satisfactorily and effectively to an airplane windshield during flight while it is raining without requiring any mechanical distribution of the treating material over the surface of the windshield, such as by the use of wipers or a jet blast.

Another object is to provide such treating material which will be effective to maintain visibility through the windshield where salt water spray, instead of rain, is impinging on the windshield.

More specifically, it is an object to mask or blanket the exterior surface of the windshield with substantially a molecular film sufficiently continuous to reduce the affinity of the windshield material for the water molecules of the rain so that the rain will form droplets which will be swept readily from the windshield by air passing over it.

Expressing the specific object in a different way, it is an object to utilize a treating composition having a surface tension less than the surface tension of the windshield and which will adhere to the windshield to mask its surface from the water particles, yet which conditioning composition itself will not appreciably reduce the transparency of the windshield. In order to accomplish the foregoing objects, a treating material devoid of water is used which has three principal components, namely a component which will render the surface of the windshield hydrophobic, hereinafter designated as the repellent component, second a component which will effect rapid and extensive distribution of the repellent component over the surface of the windshield to be treated, which component is hereinafter designated as the spreading component, and, third, solvent which must be compatible with both the repellent component and the spreading component. The combination or mixture of the repellent component, the spreading component and the solvent component will hereinafter be designated as the surface-conditioning composition. It will be understood that it is such composition that should have the various attributes to accomplish the objects, provide the advantages and possess the desirable characteristics enumerated above.

The repellent component of the surface-conditioning composition preferably is a copolymer of the silicotitanium type, silicosilicon type or silicozirconium type, or some combination cationic amino chemical in which the cation portion of the molecule has at least four carbon atoms, or mixtures of such chemicals. The solvent component must be substantially nonaqueous and readily evaporable and preferably is of the hydrocarbon type, or the alcohol type, of Freon 113, or some mixture thereof. Preferably the greatest proportion of the composition by weight is the repellent component and the smallest proportion by weight is the spreading component.

Silicotitanium copolymer which can be used as or in the repellent component of the surface-conditioning composition can be made in accordance with the disclosure of U.S. Pat. No. 2,512,058, or more specifically as disclosed in Examples, I, II and III of the U.S. patent application of Jacob M. Fain and Edward McDonnell for Water Repellent Compositions, Ser. No. 310,122, filed Sept. 19, 1963. Such U.S. patent application is now abandoned but is referred to in U.S. Pat. No. 3,433,750 and consequently is available to the public. Such examples are:

EXAMPLE I

To 100 cc. of dimethyldiethoxysilane, 0.25 cc. of concentrated sulphuric acid was added to acidify the said siliane and then 50 cc. of water were slowly added with stirring. Aqueous and oil phases were formed. After addition of the water 25 cc. of a 4% solution of sodium carbonate in water were added to neutralize the acid catalyst. Hexane was added to form a solution with the hydrolysis product. The hexane solution of the hydrolysis product was separated from the aqueous phase heated to 100 to 105° C., and hexane and the ethyl alcohol formed by the hydrolysis and any water present were removed by distillation, leaving the hydrolysis product as a liquid residue.

The hydrolysis product formed by this procedure was then mixed with 50% by volume of tetrabutyl titanate and the resulting mixture was refluxed at 100 to 105° C. for two hours to form the desired silico-titanium copolymer.

EXAMPLE II

To 100 cc. of dimethyl diethoxy silane, 0.25 cc. of concentrated sulphuric acid was added to acidify the said silane and then 50 cc. of water were added slowly with stirring. Aqueous and oil phases were formed. After addition of the water, 25 cc. of a 4% solution of sodium carbonate in water were added to neutralize the acid catalyst. Hexane was added to form a solution with the oil phase. The hexane solution was separated from the aqueous phase, heated to 100 to 105° C. and hexane and the ethyl alcohol formed by the hydrolysis and any water present were removed by distillation, leaving the hydrolysis product as a liquid residue.

To 50 cc. of hydrolysis product formed by this procedure, there were added 5 cc. of a partially polymerised butyl titanate whose structure is assumed to be

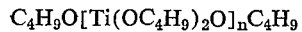

$n$ appears to be approximately 8, in 20 cc. hexane. The reaction mixture was refluxed for two hours at a pot temperature at 150° C. to form the clear amber, liquid copolymer.

EXAMPLE III 25 parts by weight of monoethyltrichlorosilane and 75 parts by weight of dimethyldichlorosilane were mixed in ether solution and added to cracked ice representing water in excess of the amount required for the hydrolysis of the said silanes. An ether layer containing the hydrolysis product separated from the excess water containing liberated hydrogen chloride and was removed and the ether evaporated therefrom. The residue was then added to tetrabutyl titanate in the proportion of 40 parts of the hydrolysis product to 17.2 parts of the titanate. The mixture was heated for 8 hours at 200° C. under refluxing conditions in the absence of moisture and then refluxing was discontinued to heat the mixture for 8 hours in the open at 200° C. A clear viscous homogenous resin was obtained.

In Example I of such application the hydrolysis product of dimethyldiethoxysilane is combined with tetrabutyl titanate in the proportions by weight of 1.74 to 1. Alternatively, silicotitanium copolymers can be made by following the procedure specified in Example I of such patent application, but using proportions of such hydrolysis product to tetrabutyl titanate by weight of 0.87 to 1 or 0.58 to 1.

Another repellent component is silicosilicon copolymer which can be produced by the same procedure as that used in making silicotitanium copolymer as described in Example I of said U.S. patent application Ser. No. 310,122. In the production of silicosilicon copolymer, the hydrolysis product of dimethyldiethoxysilane can be combined with tetraethyl silicate a tetralkyl silicate, in the proportions of 5 parts of the hydrolysis product to 1 part of the silicate by weight, of 2½ parts of the hydrolysis product to 1 part of the silicate by weight, or 1⅔ parts of the hydrolysis product to 1 part of the silicate by weight. A higher state of polymerization can be obtained if the heating under reflux at 105° C. for two hours is supplemented by further refluxing at a temperature of 150° C. for one hour.

The repellent component of the composition may also be silicozirconium copolymer. In this instance the hydrolysis product of dimethyldiethoxysilane produced in accordance with the disclosure of Example I in said U.S. patent application Ser. No. 310,122 is combined with tetrabutyl zirconate, a tetraalkyl zirconate, in accordance with the procedure specified in Example I of said U.S. patent application in proportions by weight of 0.92 to 1 of the hydrolysis product to the zirconate, or 0.46 to 1 of the hydrolysis product to the zirconate, or 0.23 parts of the hydrolysis product to 1 part of the zirconate. Since tetrabutyl zirconate in its pure form is a solid, the proportions by weight given above are those of a 30% solution of tetrabutyl zirconate by weight in xylene.

It will thus be seen that in each instance the hydrolysis product of dimethyldiethoxysilane is combined with an alkoxy compound of a selected Group IV element, such as titanium, of which the representative example of tetrabutyl titanate is specified above. The repellent component copolymer examples are compatible with each other so that the repellent component can be a combination of any of the copolymers specified.

The cationic spreading components may itself have water-repellent characteristics, but does not have a good persistence as the copolymer type of repellent component. Chemicals effective as spreading components are amino compounds with the following formula:

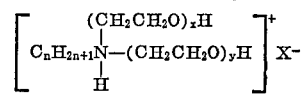

where $n = 4$ to 22

$x + y = 0$ to 5, not necessarily an integer, and

X is an anion of the hydroxide, acetate, chloride, oleate, formate or lactate type.

Examples of such amino chemicals are the amines, butylamine, hexylamine, octylamine, decylamine and "coco"

amine which is a mixture of amines where $n=8$ to 18, and salts of such amines, such as acetates, chlorides and oleates, for example. Additional examples within the formula are 2-amino-heptane, 2-amino-nonane, 2-amino-hendecane and 2-amino-pentadecane, which are beta amines, and their various salts. Another example where $x+y=2$ is cocopolyoxyethylene (2) amine. The salts of such formula are water soluble to a greater extent than the amines themselves in most instances. The amine or salt must be water soluble, at least to some extent, in order to have cationic properties, but such solubility or dispersibility can be quite low, such as possibly as low as 0.01 percent.

Additional amino chemicals which have been found to be effective spreading components, but which are not within the above formula are Dimethyldicocoammonium salt having suitable solubility characteristics, such as the chloride, acetate, oleate, lactate or formate, The cationic fluorochemical 1,1-dihydropentadecafluorooctylamine ($C_7F_{15}CH_2NH_2$), An amino polydimethylsiloxane acetate polymer having a molecular weight of approximately 1600 in which the nitrogen content is 3.5 percent by weight, A long-chain cationic amine acetate containing a carbonyl group.

At least most of these spreading component compositions are compatible with each other so that mixtures of two or more of them can be used as the spreading component of the surface-conditioning composition.

The solvent component of the surface-conditioning composition should have low flammability, low toxicity, a low freezing point and should be inert with respect to airplane materials, that is, a material which is noncorrosive and which will not cause deterioration of materials such as rubber and plastic. As far as solvent properties are concerned, various hydrocarbons can be used including kerosene, benzene, toluene and aliphatic naphtha. Also alcohols can be used as the solvent component, such as methanol, ethanol, propanol, isopropanol, butyl alcohol, amyl alcohol and isoamyl alcohol. Some of these and other hydrocarbons and alcohols are undesirable because they lack to a greater or lesser extent some of the properties mentioned above. A very desirable solvent is Freon 113, i.e., 1,1,2-1,2,2 - trichlorotrifluoroethane. This chemical has a boiling point of 188° F. and a freezing point of −34° F. An aliphatic naphtha having a minimum flash point of 100° F. has proven to be reasonably satisfactory. Freon 113 is miscible in all proportions with various hydrocarbons. A mixture of compatible solvents can be used as the solvent component of the surface-conditioning composition. While not all of the repellent components and spreading components are of equal effectiveness, it has been found that the proportion of the repellent component should be in the range of 1 to 10 percent of the surface-conditioning composition by weight, a satisfactory proportion usually being 5 percent by weight, although as much as 35 percent of the surface-conditioning composition by weight can be repellent component without detrimental effects occurring. The spreading component has been found to be beneficial in proportions of 0.05 percent to 1 percent of the surface-conditioning composition by weight, the preferred amount of spreading component usually being from 0.1 to 0.2 percent. Use of spreading component in excess of approximately 1 percent has been found to reduce the persistency of the surface-conditioning composition on a windshield surface. The balance of the surface-conditioning composition is, of course, solvent.

While it is possible to project repellent component of the surface-conditioning composition in solvent on the windshield surface separate from spreading component in solvent component if the streams intersect, it is preferred to have the repellent component, the spreading component and the solvent component mixed together to form a single homogeneous surface-conditioning composition. These components can be blended in any order and mixed quite easily without being heated or requiring other special treatment.

Representative examples of the surface conditioning composition are given below.

EXAMPLE IV

| | Percent by wt. |
|---|---|
| Silicotitanium copolymer | .5 |
| Cationic amino chemical | 0.1–0.2 |
| 1,1,2-1,2,2-trichlorotrifluoroethane | 94.85 |

EXAMPLE V

| | |
|---|---|
| Silicosilicon copolymer | 5 |
| Cationic amino chemical | 0.1–0.2 |
| 1,1,2-1,2,2-trichlorotrifluoroethane | 94.85 |

EXAMPLE VI

| | |
|---|---|
| Silicozirconium copolymer | 5 |
| Cationic amino chemical | 0.1–0.2 |
| 1,1,2-1,2,2-trichlorotrifluoroethane | 94.85 |

The surface-conditioning composition of the present invention can then be applied to the surface of a windshield in any effective manner, but it is preferred to project the composition onto a windshield as one or more substantially solid streams.

In projecting a substantially solid stream of surface-conditioning composition liquid onto an aircraft windshield, it is desirable to project the stream substantially in the direction of airflow over the windshield and at a reasonably small angle to the windshield, such as at an angle of 10° to 45° to the plane of the windshield. It is not necessary to spread the surface-conditioning composition over the windshield by a mechanical device such as a windshield wiper. Under heavy rain conditions the persistence of the surface-conditioning composition is at least a few minutes, such as from 2 minutes to 15 minutes, and the persistence is proportionately greater if the rain is lighter.

In the application of surface-conditioning composition to an airplane windshield, it has been found that the effect of the spreading component is to cause the surface-conditioning composition to spread rapidly over a large area of the windshield surface. The solvent will evaporate in a period from a fraction of a second to perhaps a couple of seconds. Excess spreading component and repellent component is dissipated within a few second, such as from 2 to 10 seconds, by erosion caused by wind and rain. The repellent component which has been distributed over the surface of the windshield by the spreading component persists for several minutes at least and, as mentioned, for a longer period of time in a lighter rain. In order to be effective to repel rain, the repellent component of the surface-conditioning composition should be less than 45 percent depleted, that is, more than about 55 percent of the area of the windshield surface over which such composition is distributed should be blanketed or masked by the repellent component. The water-repellent effect of the repellent component drops precipitously when the area over which the composition has been distributed is depleted of the repellent component to an extent greater than 45 percent. It may be, however, that initially the repellent component does not mask effectively more than 65 percent to 75 percent of such area of composition distribution.

The substantially solid stream or streams of surface-conditioning composition can be projected onto the windshield in any of various ways. These include propulsion by an aerosol propellant, or by compressed gas, or by a pump simply exerting pressure on the liquid surface-conditioning composition itself. Whichever method is used, it is desirable to keep dispersion of the stream prior to contact with the windshield surface to a minimum to prevent scattering of the surface-conditioning composition on the windshield or loss of such composition by being blown away. The spreading component of the composition effects the distribution of the repellent component over the windshield surface. In every instance the amount of surface-conditioning composition projected onto the windshield will, however, be considerably in excess of that which adheres to the windshield and such excess will be swept away or eroded by wind and rain instead of accumulating as a thick layer on the windshield surface.

We claim as our invention:

1. A composition for forming optically clear, water repellant films on surface of transparent solids consisting essentially of a solution without any water present therein of a silico titanium copolymer formed by reacting at a temperature of 100 to 150° C., the hydrolysis product of dimethyldiethoxysilane with tetrabutyl titanate and as a cationic surface-active quaternary ammonium compound, dicocodimethylammonium chloride, in a solvent.

2. A composition for forming optically clear, water-repellant films on surfaces of transparent solids, consisting essentially of a solution without any water present therein of a silicotitanium copolymer formed by reacting at a temperature of 100° C. to 150° C. the hydrolysis product of dimethyl diethoxy silane with tetrabutyl titanate and as a cationic, surface-active quarternary ammonium compound, a dimethyldicocoammonium salt, in an organic solvent, the content of ammonium compound being 0.05 to 1% by weight of the composition.

References Cited

UNITED STATES PATENTS

| | | | |
|---|---|---|---|
| 3,262,830 | 7/1966 | Vincent | 156—329 |
| 3,352,709 | 11/1967 | Gunnar et al. | 106—13 X |
| 3,310,429 | 3/1967 | Gunnar et al. | 106—13 X |
| 3,308,080 | 3/1967 | Haenni | 117—124 X |
| 3,291,634 | 12/1966 | Wada et al. | 117—135.5 |
| 2,732,320 | 1/1956 | Guillissen et al. | 117—103 |
| 2,512,058 | 6/1950 | Gulledge | 260—46.5 |
| 3,433,750 | 3/1969 | Fain et al. | 260—2 |

FOREIGN PATENTS

| | | | |
|---|---|---|---|
| 700,118 | 12/1964 | Canada | 106—13 |
| 215,860 | 9/1956 | Australia | 117—161 |

DONALD E. CZAJA, Primary Examiner

C. W. IVY, Assistant Examiner

U.S. Cl. X.R.

106—2, 13; 117—124 F, 161 ZA; 252—117; 260—2 T, 2 S, 46.56